United States Patent Office 3,434,532
Patented Mar. 25, 1969

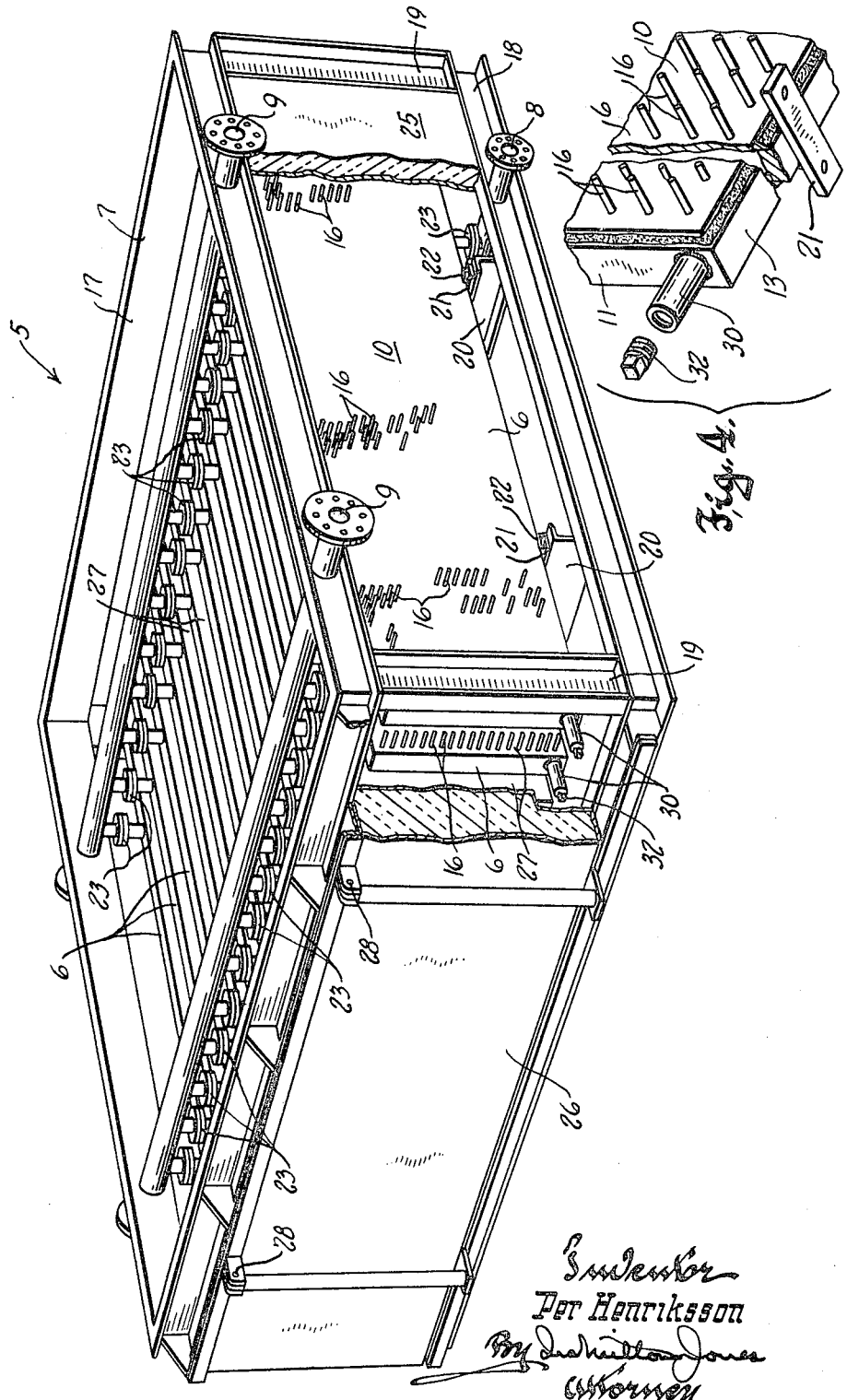

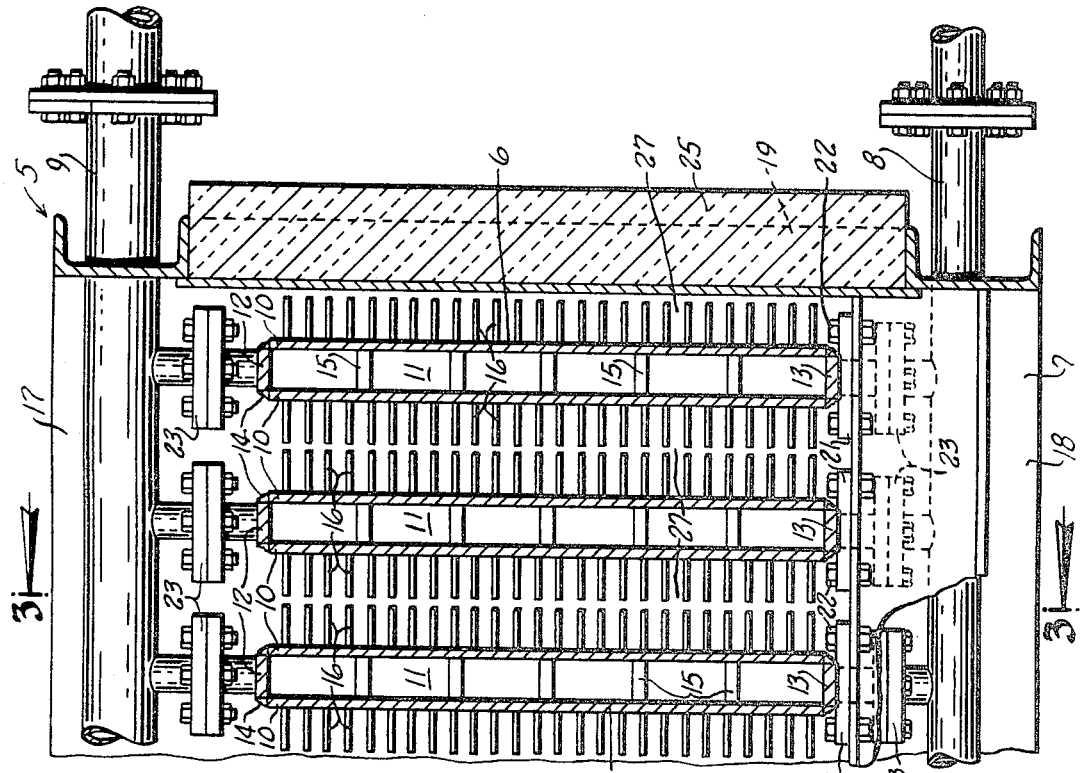
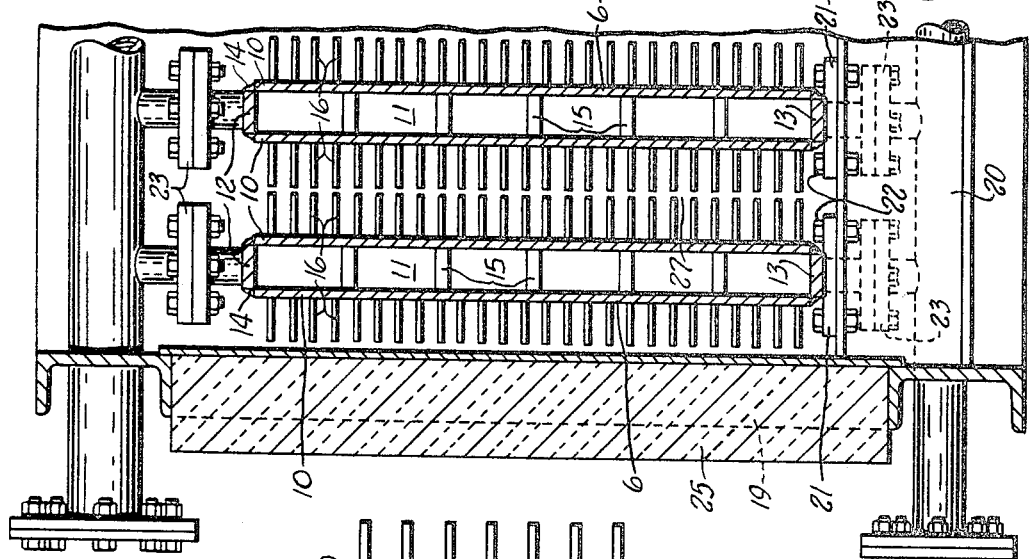
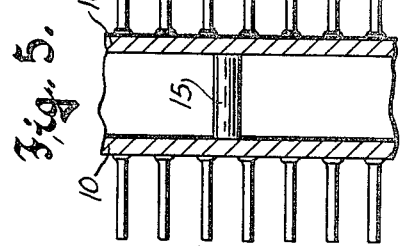

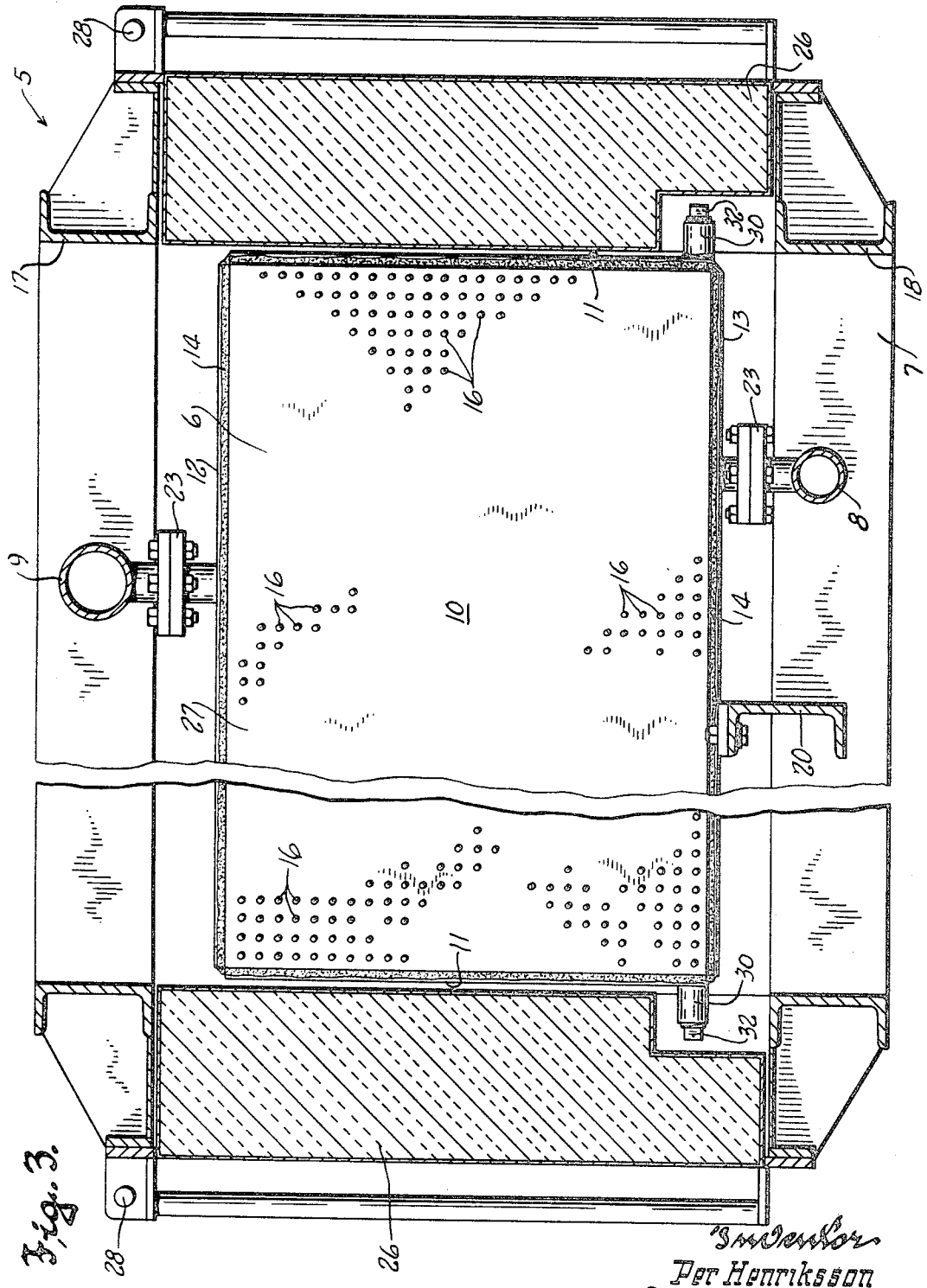

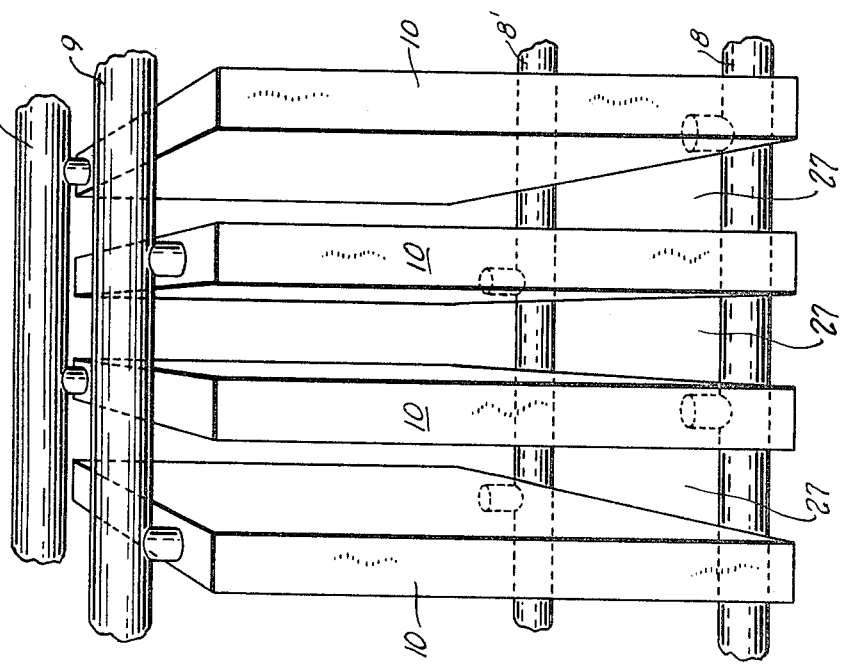

3,434,532
HEAT EXCHANGER FOR WASTE
HEAT RECOVERY
Per Henriksson, Kungsangen, Sweden, assignor to David
Dalin, Vensberg, Tosse, Sweden
Filed Mar. 23, 1967, Ser. No. 625,354
Int. Cl. F28f 3/00
U.S. Cl. 165—75                    4 Claims

ABSTRACT OF THE DISCLOSURE

A heat exchanger having modular heat exchange elements, each consisting of a pair of rectangular flat plates and narrow end, top and bottom wall members that cooperate with the plates to define a box-like chamber. The modules are arranged in side-by-side relation with their plates parallel, to define channels between them through which hot gas can flow, and they are connected at their bottoms with a feed water inlet and at their tops with a steam or hot water outlet. Extended surface elements project outwardly from the plates for high heat transfer efficiency.

---

This invention relates to heat exchangers intended for abstracting heat from a flowing gaseous medium and transferring it to another medium; and the invention relates more specifically to a heat exchanger that is particularly adapted for the utilization of waste heat such as that contained in the exhaust gases of diesel engines and the like.

It is of primary importance that a heat exchanger intended to utilize the heat content of engine exhaust gases and similar waste heat sources should be sturdy and highly efficient but very compact. If intended for producing low pressure steam or hot water, such a heat exchanger must be capable of operating satisfactorily with relatively poor quality feed water, and in any case the surfaces of such a heat exchanger should be readily accessible for cleaning. It is also very desirable that those elements in such a heat exchanger that are exposed to high temperatures should be readily removable and replaceable in case they are damaged by overloading or carelessness.

In general the requirements for high efficiency, ready interchangeability of heat exchange elements and easy accessibility of heat exchange surfaces are in conflict with the need for utmost compactness, which is often dictated by space limitations in the installation of such a waste heat unit and which usually has a more or less direct bearing upon its cost.

The general object of this invention is to provide a heat exchanger that is particularly intended for the utilization of waste heat and which very satisfactorily meets all of the requirements above set forth.

Another and more specific object of the present invention is to provide a very compact but nevertheless efficient and inexpensive heat exchanger that is very sturdy and stable and is thus well adapted for recovery of heat from waste gases having a pulsating flow, such as the exhaust gases of a diesel engine or the like.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of physical embodiments of the invention, constructed according to the best modes so far devised for the practical application of the principles thereof, and in which:

FIGURE 1 is a perspective view of a heat exchanger embodying the principles of this invention, with portions broken away;

FIGURE 2 is a vertical sectional view through the heat exchanger;

FIGURE 3 is a vertical sectional view taken on the plane of the line 3—3 in FIGURE 2;

FIGURE 4 is a fragmentary perspective view on a larger scale, of a lower end portion of one of the modular units, showing a clean-out plug;

FIGURE 5 is a fragmentary vertical sectional view through one of the modules, on an enlarged scale; and FIGURE 6 is a more or less diagrammatic front perspective view illustrating a modified embodiment of the invention.

Referring now to the accompanying drawings, the numeral 5 designates generally the heat exchanger of this invention, which comprises, in general, a plurality of heat exchange modules 6 that are supported by a frame 7 and connected with inlet duct means 8 for the medium to be heated and outlet duct means 9 for the same medium.

Each of the modules 6 comprises a pair of substantially flat rectangular plates 10 that are similar in size and shape, and narrow, strip like end wall elements 11 and top and bottom wall elements 12 and 13 that are secured to the edges of the plates to hold the plates in spaced apart parallel relationship. The narrow wall elements 11, 12 and 13 of each module cooperate with its plates 10 in defining a substantially narrow chamber, of which the plates comprise opposite side walls. The connections of the narrow wall elements to the plates are preferably formed by welding, care being taken to have soundly welded seams 14 all around the plates so that the modules do not leak.

Because of its narrow, flat sided configuration, each such heat exchange module has relatively large surface area for its volume, and thus has high capacity for effecting indirect heat exchange. Such modules have the further important advantages of lending themselves to a very compact arrangement.

To provide reinforcement for the modules by which their flat plate side walls 10 are prevented from bulging outwardly, tie pins 15 bridge the plates at several locations within the chamber defined by the module, which locations are spaced from one another and from the side walls. The tie pins 15 of each module, which are of course disposed perpendicular to its plates, are secured to the latter by having their opposite ends butt welded to the opposing inner surfaces of the plates. It will be apparent that the modules can withstand some amount of internal pressure and will therefore be entirely adequate for the relatively low pressures encountered in a waste heat unit.

To insure high heat transfer efficiency of the modules, each plate is provided with numerous closely spaced, outwardly projecting, rod-like extended surface elements 16, arranged in a substantially uniform pattern over its outer surface. The extended surface elements are of course made of a material having good capacity for conducting heat, and they are secured to the plate in good heat transfer relation thereto, preferably by having their inner ends butt welded to the plate.

The frame 7 on which the several heat exchange modules are supported can comprise similar top and bottom rectangular frame portions 17 and 18, respectively, held in spaced, superimposed relationship by upright posts 19 at their corners. The entire frame can be formed of U-section channel members or the like, as shown, secured together by welding.

A pair of parallel transverse beams 20 which are spaced from one another and from the end members of the frame extend across the bottom frame portion 18 with their top surfaces at a level slightly above that of the upper surface of the bottom frame portion. The several modules rest on the top surfaces of the beams 20, extending transversely to the beams with their flat end walls 11 upright and parallel to one another. The modules are laterally spaced apart by distances such that there is only a very small space between the tips of the extended surface elements 16 that project from adjacent modules. The modules are held against shifting on the beams 20 by means of small plate-like feet 21 welded to the bottoms of the modules (as best seen in FIGURE 4) and secured to the beams by means of bolts 22.

Each of the modules has its interior communicated with the inlet duct means 8 for the medium to be heated, which extends across the frame parallel to the rails 20 and beneath the modules, and with the outlet duct means 9 for the same medium, which likewise extends transversely to the modules but is located above them. The connections between the modules and the respective duct means 8 and 9 preferably comprise pipe flanges 23 which provide for connection of each module individually with the inlet and outlet duct means and for ready disconnection of the module therefrom.

Surrounding the frame at all four sides thereof are walls or cover portions 25 and 26 which thus define a flue passage or duct across which the modules extend and which the modules divide into passages sections or channels 27 that comprise the spaces between modules. It will be understood that suitable duct means (not shown) are connected with the bottom of such flue passage to communicate it with a source of hot gases and are connected with the top of the frame to provide a gas outlet passage. The flue pasage is thus arranged to cause the hot gases from which heat is to be abstracted to flow parallel to the narrower dimension of the rectangular flat plates 10.

Adjacent to the ends of the modules the walls or cover portions 26 are connected to the frame 7 by means of hinges 28, or in some other manner which permits those cover portions to be readily opened so that easy access can be had to the modules. To replace a module it must be disconnected from its inlet and outlet duct means 8 and 9 and the bolts 22 must be removed from the plate-like feet 21. It can then be slid endwise out of the frame through the opening left by such opened cover portion.

It has been found that scale which normally forms on the inner wall surfaces of the modules when poor quality water is used, and which interferes with heat transfer through the plates, tends to loosen and collect in the bottom of each module as a result of temperature changes normally occurring during operation of the heat exchanger. To facilitate cleaning such sediment out of the modules, each module is provided with a cleanout drain at each end thereof, near its bottom.

Each such cleanout drain preferably comprises a nipple 30 secured in and projecting outwardly from an end wall 11 of the module and communicated with the interior of the module. A threaded readily removable plug 32 closes the outer end of the nipple. With its plugs 32 removed, scale and other foreign matter which collects in the bottom portion of a module can be flushed out of it, either by injecting wash water through one of the nipples 30 or by flushing water through the module from the inlet duct means 8.

The exterior surface of the modules can be readily cleaned by any of the conventional methods such as soot blowing with steam or air, or flushing with water to which may be added commonly used cleaning chemicals.

The arrangement diagrammatically illustrated in FIGURE 6 enables the capacity of the heat exchange apparatus to be readily adjusted to the heat content of the hot gases or other heating medium being passed through it. In this embodiment of the invention there are a plurality of inlet ducts (two such ducts 8 and 8' being shown in the illustrated apparatus) and an equal number of outlet ducts 9 and 9', one for each inlet duct. Alternate modules across the unit are connected with the inlet duct 8 and with its corresponding outlet duct 9, while the remaining modules are connected with inlet duct 8', and its corresponding outlet duct 9'. At any time that the heat content of the heating medium falls substantially below normal, one of the duct systems 8–9 or 8'–9' can be shut down, so that water is circulated only through the modules connected with the other duct system, thus assuring that such water as issues from the heat exchange apparatus will have the desired high temperature despite the lower heat content of the heating medium. It will be understood that the modules can be connected with three or more inlet-outlet duct systems, instead of the two sets illustrated, to provide for as much flexibility as may be desired.

From the foregoing description taken with the accompanying drawings it will be apparent that this invention provides a very compact, efficient and inexpensive heat exchanger that is especially well adapted for waste heat recovery, and that the heat exchanger of this invention is very flexible in operation and is very easy to maintain and repair.

What is claimed as my invention is:

1. A heat exchanger for effecting indirect heat exchange between two fluid media, wherein one fluid medium flows through a bank of side-by-side spaced apart elongated box-like modules having extended surface elements projecting from the opposite sides thereof to be swept by the other medium as it flows through a duct in which said bank of modules is located, characterized by:
   (A) a supporting structure including spaced apart substantially rectangular frames,
      said bank of modules being located between said frames;
   (B) inlet and outlet headers carried by said frames;
   (C) duct means connecting each of said modules with an inlet header and an outlet header;
   (D) a first pair of spaced apart parallel walls fixed to said frames and extending lengthwise of and adjacent to the outermost of said bank of elongated box-like modules;
   (E) a second pair of spaced apart parallel walls extending crosswise of and adjacent to the ends of said modules,
      said two pairs of spaced apart parallel walls coacting to form that portion of the duct in which said modules are located; and
   (F) means mounting at least one of said second pair of walls for movement between a closed position coacting with the other of said walls to form said portion of the duct in which said modules are located and an open position exposing the adjacent ends of said modules and the spaces therebetween to enable cleaning the extended surface elements and the outer surfaces of said modules.

2. The heat exchanger of claim 1, wherein said frames are spaced apart a distance sufficient to permit endwise translation of said modules between the frames to and from their operative positions,
   so that upon opening of said movably mounted wall and disconnection of a module from the inlet and outlet headers, said module can be removed and replaced without disturbing any of the other modules.

3. The heat exchanger of claim 2, wherein said frames are superimposed one above the other,
   and further characterized by supporting beams fixed to the lowermost frame and extending transversely of said bank of modules in supporting relation therewith.

4. The heat exchanger of claim 2, wherein both of said second pair of walls are movable between closed and open position,
   and wherein the means movably mounting said second pair of walls comprises hinge means connecting the same with one of said frames.

(References on following page)

References Cited

UNITED STATES PATENTS

| | | | |
|---|---|---|---|
| 1,576,410 | 3/1926 | Connery | 165—95 |
| 1,818,402 | 8/1931 | Jones | 122—494 |
| 3,168,073 | 2/1965 | Durham et al. | 122—235 X |
| 3,323,495 | 6/1967 | Blaskowski | 122—498 X |
| 1,958,899 | 5/1934 | MacAdams | 165—144 X |
| 2,395,543 | 2/1946 | Gallaher | 165—145 |
| 2,875,986 | 3/1959 | Holm | 165—145 |

FOREIGN PATENTS

| | | |
|---|---|---|
| 579,468 | 8/1946 | Great Britain. |
| 1,215,858 | 11/1959 | France. |
| 210,669 | 10/1940 | Switzerland. |

ROBERT A. O'LEARY, *Primary Examiner.*

ALBERT W. DAVIS, *Assistant Examiner.*

U.S. Cl. X.R.

122—235, 494, 498; 165—76, 95, 157, 164